United States Patent
Inui et al.

(10) Patent No.: US 12,488,599 B2
(45) Date of Patent: Dec. 2, 2025

(54) PARKING ASSISTANCE DEVICE

(71) Applicant: AISIN CORPORATION, Aichi (JP)

(72) Inventors: Yoji Inui, Kariya (JP); Masaki Furukawa, Kariya (JP); Ryutaro Kato, Kariya (JP); Yuya Shimohira, Kariya (JP)

(73) Assignee: AISIN CORPORATION, Aichi (JP)

( * ) Notice: Subject to any disclaimer, the term of this patent is extended or adjusted under 35 U.S.C. 154(b) by 38 days.

(21) Appl. No.: 18/692,890

(22) PCT Filed: Nov. 7, 2022

(86) PCT No.: PCT/JP2022/041352
§ 371 (c)(1),
(2) Date: Mar. 18, 2024

(87) PCT Pub. No.: WO2023/085228
PCT Pub. Date: May 19, 2023

(65) Prior Publication Data
US 2025/0139989 A1    May 1, 2025

(30) Foreign Application Priority Data
Nov. 15, 2021 (JP) .................. 2021-185915

(51) Int. Cl.
*G06V 20/58* (2022.01)
*G06T 7/13* (2017.01)
(Continued)

(52) U.S. Cl.
CPC .............. *G06V 20/586* (2022.01); *G06T 7/13* (2017.01); *G06T 7/60* (2013.01); *G06T 7/74* (2017.01);
(Continued)

(58) Field of Classification Search
CPC ...... G06V 20/586; G06V 10/44; G06V 10/60; G06T 7/13; G06T 7/60; G06T 7/74;
(Continued)

(56) References Cited

U.S. PATENT DOCUMENTS

2020/0193190 A1* 6/2020 Okada .................. G05D 1/0246

FOREIGN PATENT DOCUMENTS

JP    2021-068125 A    4/2021

OTHER PUBLICATIONS

Extended European Search Report dated Jan. 31, 2025 in Application No. 22892727.3.

* cited by examiner

*Primary Examiner* — Joan T Goodbody
*Assistant Examiner* — Godfrey Aleksander Maciorowski
(74) *Attorney, Agent, or Firm* — Sughrue Mion, PLLC

(57) ABSTRACT

A parking assistance device includes: a candidate line detection unit that detects a candidate line that is a candidate for a boundary line in image data obtained by imaging a periphery of a vehicle; and a boundary line recognition unit that executes a determination process to determine whether or not a difference in luminance between areas on an outside of the candidate line in a width direction in the image data, the areas being on both sides of the candidate line, is equal to or larger than a luminance threshold, does not recognize the candidate line as a boundary line when determining that the difference in luminance is equal to or larger than the luminance threshold, and recognizes the candidate line as a boundary line when determining that the difference in luminance is less than the luminance threshold.

5 Claims, 10 Drawing Sheets

(51) Int. Cl.
    *G06T 7/60*           (2017.01)
    *G06T 7/73*           (2017.01)
    *G06V 10/44*         (2022.01)
    *G06V 10/60*         (2022.01)
    *B60W 30/06*        (2006.01)

(52) U.S. Cl.
    CPC .............. *G06V 10/44* (2022.01); *G06V 10/60*
               (2022.01); *B60W 30/06* (2013.01); *B60W*
               *2420/403* (2013.01); *G06T 2207/30264*
               (2013.01)

(58) Field of Classification Search
    CPC ........ G06T 2207/30264; B60W 30/06; B60W
                                                 2420/403
    See application file for complete search history.

PARKING ASSISTANCE DEVICE

CROSS REFERENCE TO RELATED APPLICATIONS

This is a National Stage of International Application No. PCT/JP2022/041352 filed Nov. 7, 2022, claiming priority based on Japanese Patent Application No. 2021-185915 filed Nov. 15, 2021, the entire contents of which are incorporated in their entirety.

TECHNICAL FIELD

The present embodiment relates to a parking assistance device.

BACKGROUND ART

Conventionally, in a parking assistance device that performs image processing on image data obtained by imaging a periphery of a vehicle, a boundary line on the road surface is detected in the image data in order to set a parking target position.

CITATIONS LIST

Patent Literature

Patent Literature 1: JP 2021-68125 A

SUMMARY OF THE DISCLOSURE

Technical Problems

However, in the conventional technique described above, in a case where there is a shadow of another vehicle or the like on the road surface, when color blurring occurs at the edge of the shadow in imaging data obtained by imaging the edge of the shadow, the blurring portion is erroneously recognized as a boundary line.

Therefore, one of the problems to be solved by the embodiment of the present disclosure is to obtain, for example, a parking assistance device capable of improving the accuracy in detection of a boundary line.

Solutions to Problems

A parking assistance device according to an embodiment includes: a candidate line detection unit that detects a candidate line that is a candidate for a boundary line in image data obtained by imaging a periphery of a vehicle; a boundary line recognition unit that executes a determination process to determine whether or not a difference in luminance between areas on an outside of the candidate line in a width direction in the image data, the areas being on both sides of the candidate line, is equal to or larger than a luminance threshold, does not recognize the candidate line as a boundary line when determining that the difference in luminance is equal to or larger than the luminance threshold, and recognizes the candidate line as a boundary line when determining that the difference in luminance is less than the luminance threshold; a parking target position setting unit that sets a parking target position on a basis of the boundary line; and a movement control unit that moves the vehicle to the parking target position.

With such a configuration, for example, even if the candidate line detection unit detects the edge of the shadow as the candidate line in the image data obtained by imaging the edge of the shadow, the boundary line recognition unit does not recognize the candidate line, that is, the edge of the shadow, as a boundary line when the difference in luminance between the pair of areas on both sides of the candidate line is equal to or larger than the luminance threshold. Therefore, with the above configuration, the edge of the shadow is suppressed from being erroneously recognized as a boundary line, so that it is possible to improve the accuracy in detection of a boundary line.

In the parking assistance device, for example, the boundary line recognition unit executes the determination process when the width of the candidate line does not exceed a width threshold.

In the parking assistance device, for example, when the width of the candidate line exceeds the width threshold, the boundary line recognition unit recognizes the candidate line as a boundary line without executing the determination process.

With such a configuration, even if a normal boundary line is detected as a candidate line in image data obtained by imaging the normal boundary line, and there is a difference in luminance between both sides of the candidate line, when the width of the candidate line exceeds the width threshold, the boundary line recognition unit recognizes the candidate line as a boundary line. Therefore, with the above configuration, the edge of the shadow is suppressed from being erroneously recognized as a boundary line, and the normal boundary line is easily recognized correctly.

The boundary line recognition unit executes the determination process when the resolution of the pixel of the candidate line in the image data does not exceed a resolution threshold.

In the parking assistance device, for example, when the resolution of a pixel of the candidate line in the image data exceeds the resolution threshold, the boundary line recognition unit recognizes the candidate line as a boundary line without executing the determination process.

With such a configuration, even if there is a difference in luminance between both sides of the candidate line, when the resolution of the pixel in the candidate line exceeds the resolution threshold, the boundary line recognition unit recognizes the candidate line as a boundary line. Therefore, with the above configuration, the edge of the shadow is suppressed from being erroneously recognized as a boundary line, and the normal boundary line is easily recognized correctly.

In the parking assistance device, for example, the difference in luminance between the areas on both sides is a difference between an average value of the luminance of a plurality of pixels in one of the areas and an average value of the luminance of a plurality of pixels in the other of the areas.

With such a configuration, for example, the average value of the luminance of the plurality of pixels in each of the areas is used for determination, so that the luminance of the pair of areas can be compared even if the luminance varies in the area.

In the parking assistance device, for example, the areas on both sides are located at positions separated from the candidate line by a predetermined distance.

With such a configuration, for example, the luminance difference is not taken immediately beside the candidate line, but the luminance difference is taken at positions away from the candidate line by a predetermined distance, so that it is possible to suppress the influence of color blurring at the edge of the shadow.

DESCRIPTION OF EMBODIMENTS

Figure 1:
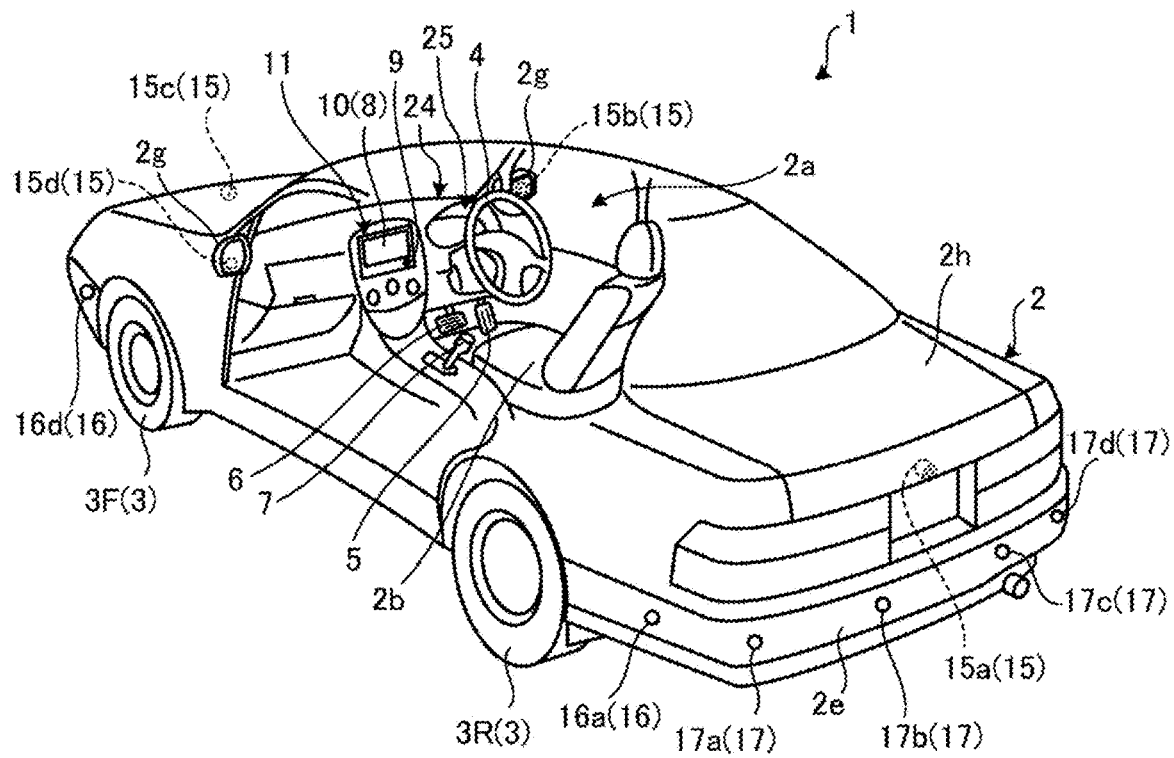
FIG. 1 is an exemplary perspective view showing a state where a part of a vehicle interior of a vehicle, to which an electronic control unit (ECU) (parking assistance device) according to an embodiment is applied, is in perspective.
Figure 2:
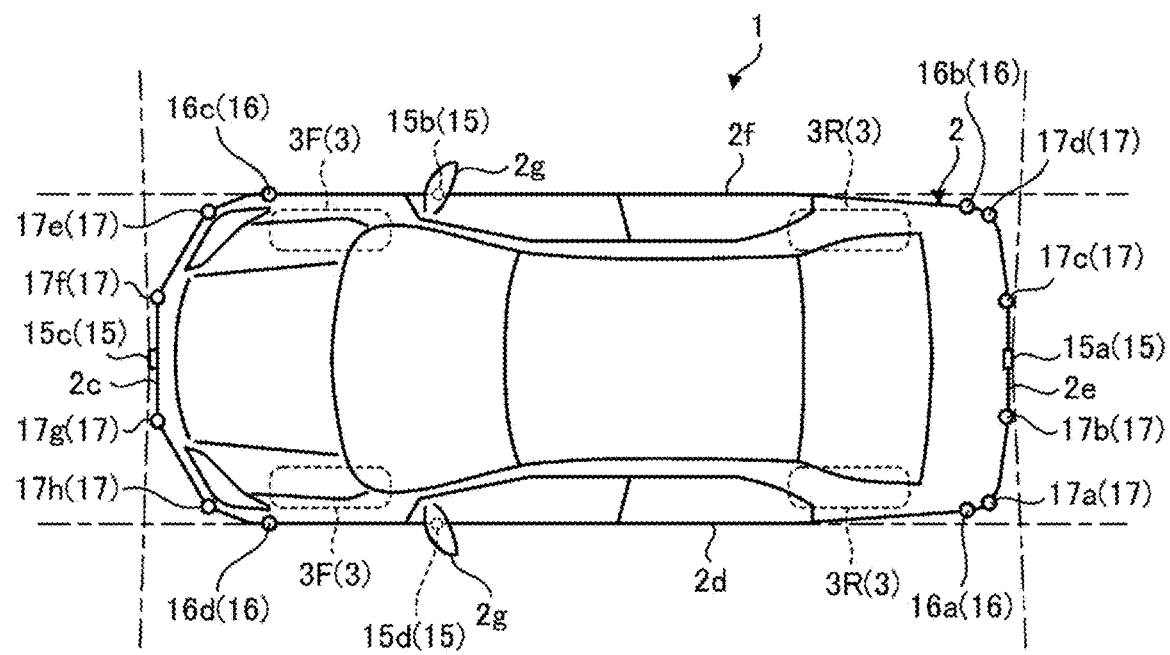
FIG. 2 is an exemplary plan view (overhead view) of the vehicle to which the ECU according to the embodiment is applied.

Hereinafter, a parking assistance device of the present embodiment can be an on-board electronic control unit (ECU) and mounted on a vehicle. The vehicle on which the parking assistance device is mounted may be, for example, a vehicle 1 as shown in FIGS. 1 and 2. FIG. 1 is an exemplary perspective view showing a state where a part of a vehicle interior 2a of the vehicle 1, to which an ECU (parking assistance device) according to the embodiment, is applied. FIG. 2 is an exemplary plan view (overhead view) of the vehicle 1 to which the ECU according to the embodiment is applied. In the present embodiment, the vehicle 1 on which a vehicle control device is mounted may be, for example, an automobile having an internal combustion engine (not shown) as a drive source, that is, an internal combustion engine automobile, or may be an automobile having an electric motor (not shown) as a drive source, that is, an electric automobile, a fuel cell automobile, or the like. Alternatively, the vehicle 1 may be a hybrid automobile using both an internal combustion engine and an electric motor as a drive sources, or may be a car including another drive source. In the vehicle 1, various transmission devices can be mounted, and various devices necessary for driving the internal combustion engine and the electric motor can be mounted, for example, systems, components, and the like.

As shown in FIG. 1, the vehicle body 2 constitutes a vehicle interior 2a in which an occupant (not shown) rides. In the vehicle interior 2a, a steering unit 4, an acceleration operation unit 5, a braking operation unit 6, a shift operation unit 7, and the like are provided in a state of facing a seat 2b of a driver as an occupant. The steering unit 4 is, for example, a steering wheel protruding from the dashboard 24, the acceleration operation unit 5 is, for example, an accelerator pedal located under the feet of the driver, the braking operation unit 6 is, for example, a brake pedal located under the feet of the driver, and the shift operation unit 7 is, for example, a shift lever protruding from a center console. Note that the steering unit 4, the acceleration operation unit 5, the braking operation unit 6, the shift operation unit 7, and the like are not limited thereto.

In the vehicle interior 2a, a display device 8 as a display output unit and an audio output device 9 as an audio output unit are provided. The display device 8 is, for example, a liquid crystal display (LCD), an organic electroluminescent display (OELD), or the like. The audio output device 9 is, for example, a speaker. The display device 8 is covered with a transparent operation input unit 10 such as a touch panel. The occupant can visually recognize an image displayed on the display screen of the display device 8 via the operation input unit 10. In addition, the occupant can perform an operation input by using his or her finger or the like to touch, push, or move across the operation input unit 10 at a position corresponding to an image displayed on the display screen of the display device 8. The display device 8, the audio output device 9, the operation input unit 10, and the like are provided, for example, in a monitor device 11 located at the center of the dashboard 24 in the vehicle width direction, that is, the left-right direction. The monitor device 11 can include an operation input unit (not shown) such as a switch, a dial, a joystick, and a push button. In addition, an audio output device (not shown) can be provided at another position in the vehicle interior 2a different from the monitor device 11, and audio can be output from the audio output device 9 of the monitor device 11 and another audio output device. Note that the monitor device 11 can also be used as, for example, a navigation system or an audio system.

Figure 3:
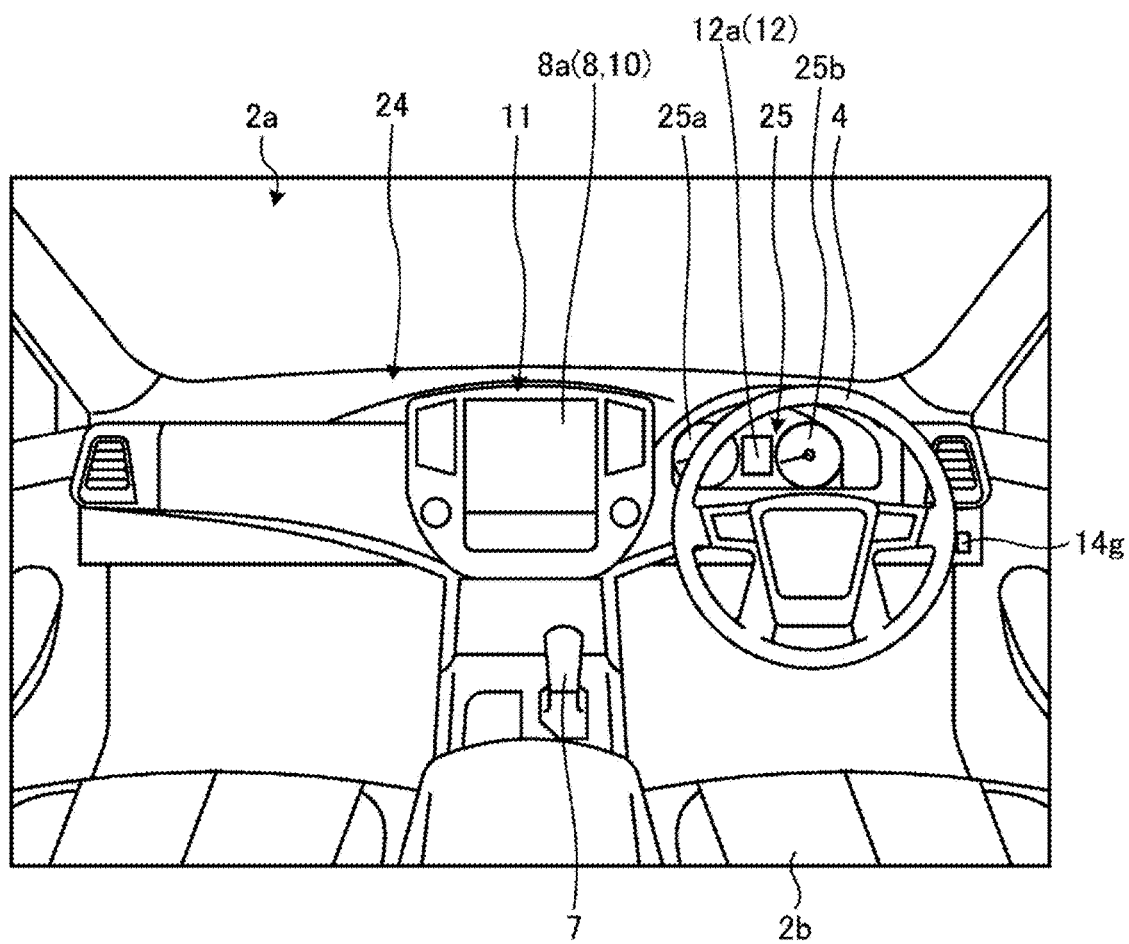
FIG. 3 is a view of an example of the dashboard of the vehicle to which the ECU according to the embodiment is applied, as viewed from the rear of the vehicle.

FIG. 3 is a view of an example of the dashboard of the vehicle 1 to which the ECU according to the embodiment is applied, as viewed from the rear of the vehicle. As shown in FIG. 3, a display device 12 different from the display device 8 is provided in the vehicle interior 2a. For example, the display device 12 is provided, for example, on an instrument panel 25 of the dashboard 24, and is located between a speed indicator 25a and a rotation number indicator 25b substantially at the center of the instrument panel 25. The size of the screen 12a of the display device 12 is smaller than the size of the screen 8a of the display device 8. The display device 12 can mainly display an image indicating information on parking assistance for the vehicle 1. The amount of information displayed on the display device 12 may be smaller than the amount of information displayed on the display device 8. The display device 12 is, for example, an LCD, an OELD, or the like. Note that information displayed on the display device 12 may be displayed on the display device 8.

As shown in FIGS. 1 and 2, the vehicle 1 is, for example, a four-wheeled automobile, and includes two left and right front wheels 3F and two left and right rear wheels 3R. All of these four wheels 3 can be configured to be steerable. The vehicle 1 includes a steering system 13 (FIG. 4) that steers at least two wheels 3. The steering system 13 includes an actuator 13a and a torque sensor 13b. The steering system 13 is electrically controlled by an electronic control unit (ECU)

14 or the like to operate the actuator 13a. The steering system 13 is, for example, an electric power steering system, a steer by wire (SBW) system, or the like. In the steering system 13, torque, that is, assist torque, is applied to the steering unit 4 by the actuator 13a to supplement the steering force, and the wheel 3 is steered by the actuator 13a. In this case, the actuator 13a may steer one wheel 3 or may steer a plurality of wheels 3. The torque sensor 13b detects, for example, torque applied to the steering unit 4 by the driver.

As shown in FIG. 2, the vehicle body 2 is provided with, for example, four imaging units 15a to 15d as a plurality of imaging units 15. The imaging unit 15 is, for example, a digital camera incorporating an imaging element such as a charge-coupled device (CCD) or a complementary metal-oxide-semiconductor (CMOS) image sensor (CIS). The imaging unit 15 can output moving image data at a predetermined frame rate. Each of the imaging units 15 includes a wide-angle lens or a fisheye lens, and can capture a range of, for example, 1400 to 190° in the horizontal direction. The optical axis of the imaging unit 15 is set obliquely downward. Therefore, the imaging unit 15 sequentially captures an external environment around the vehicle body 2 including the road surface on which the vehicle 1 can move and an area where the vehicle 1 can be parked, and outputs the captured environment as captured image data.

The imaging unit 15a is located, for example, at an end 2e on the rear side of the vehicle body 2, and is provided in a wall portion below a door 2h of a rear trunk. The imaging unit 15b is located, for example, at an end 2f on the right side of the vehicle body 2 and is provided on the right door mirror 2g. The imaging unit 15c is located, for example, at an end 2c on the front side of the vehicle body 2, that is, on the front side in the vehicle front-rear direction, and is provided on a front bumper or the like. The imaging unit 15d is located, for example, at an end 2d on the left side of the vehicle body 2, that is, on the left side in the vehicle width direction, and is provided on the door mirror 2g as a left protruding portion. The ECU 14 can execute computational processing and image processing on the basis of image data obtained by the plurality of imaging units 15 to generate an image with a wider viewing angle or generate a virtual overhead image of the vehicle 1 viewed from above. Note that the overhead image may also be referred to as a planar image.

Further, the ECU 14 performs image processing on the image captured by the imaging unit 15, and detects a boundary line indicated on the road surface around vehicle 1. The ECU 14 detects a parking target position (e.g., possible parking area, etc.) for the vehicle 1 based on the detected boundary line.

As shown in FIGS. 1 and 2, the vehicle body 2 is provided with, for example, four distance measurement units 16a to 16d and eight distance measurement units 17a to 17h as a plurality of distance measurement units 16, 17. The distance measurement units 16, 17 are sonars that emit ultrasonic waves and capture reflected waves thereof, for example. The sonar can also be referred to as a sonar sensor or an ultrasonic detector. The ECU 14 can measure the presence or absence of an object, such as an obstacle located around the vehicle 1, and the distance to the object from detection results of the distance measurement units 16, 17. That is, the distance measurement units 16, 17 are an example of a detection unit that detects an object. Note that the distance measurement unit 17 can be used, for example, to detect an object at a relatively short distance, and the distance measurement unit 16 can be used, for example, to detect an object at a relatively long distance, beyond the range of the distance measurement unit 17. The distance measurement unit 17 can be used, for example, to detect objects in the front and rear of the vehicle 1, and the distance measurement unit 16 can be used to detect an object to the side of the vehicle 1.

Figure 4:
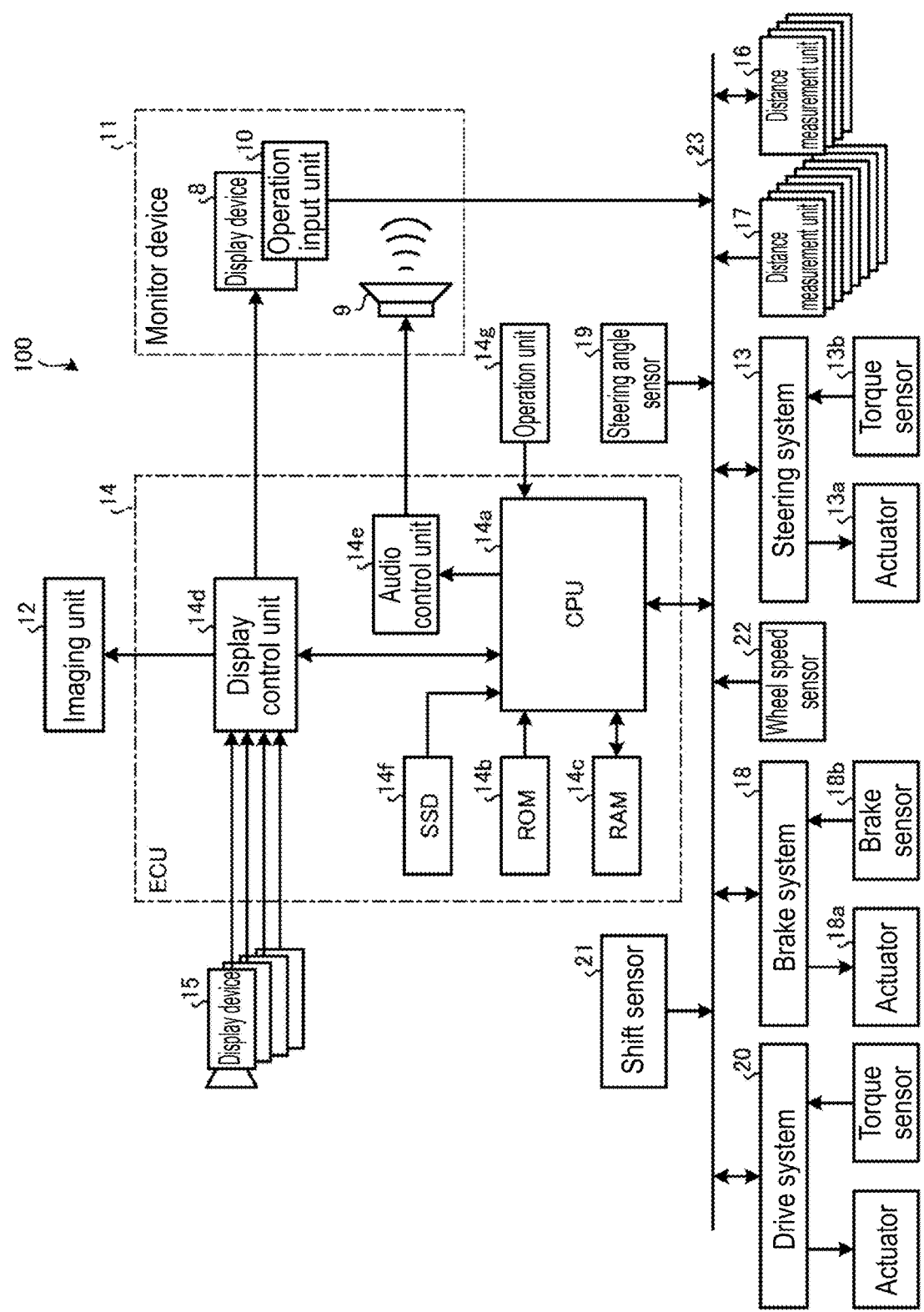
FIG. 4 is a diagram showing an example of a hardware configuration of a vehicle control system including the ECU (parking assistance device) according to the embodiment.

FIG. 4 is a diagram showing an example of a hardware configuration of a vehicle control system including the ECU (parking assistance device) according to the embodiment. As shown in FIG. 4, in the vehicle control system 100, in addition to the ECU 14, the monitor device 11, the steering system 13, the distance measurement units 16, 17, and the like, a brake system 18, a steering angle sensor 19, an accelerator sensor 20, a shift sensor 21, a wheel speed sensor 22, and the like are electrically connected via an in-vehicle network 23 as an electric communication line. The in-vehicle network 23 is configured as, for example, a controller area network (CAN). The ECU 14 can control the steering system 13, the brake system 18, and the like by sending a control signal through the in-vehicle network 23. Further, the ECU 14 can receive detection results of the torque sensor 13b, the brake sensor 18b, the steering angle sensor 19, the distance measurement unit 16, the distance measurement unit 17, the accelerator sensor 20, the shift sensor 21, the wheel speed sensor 22, and the like, operation signals of the operation input unit 10 and the like via the in-vehicle network 23.

The ECU 14 includes, for example, a central processing unit (CPU) 14a, a read-only memory (ROM) 14b, a random-access memory (RAM) 14c, a display control unit 14d, an audio control unit 14e, a solid-state drive (SSD, flash memory) 14f, and the like. The CPU 14a can execute various types of computational processing and control, such as image processing related to images displayed on the display devices 8, 12, determining a parking target position for the vehicle 1, calculating a movement route of the vehicle 1, determining the presence or absence of interference with an object, automatically controlling the vehicle 1, and canceling the automatic control. The CPU 14a can read a program installed and stored in a nonvolatile storage device such as the ROM 14b and execute computational processing according to the program. The RAM 14c temporarily stores various data used in the calculation in the CPU 14a. The display control unit 14d mainly executes image processing using image data obtained by the imaging unit 15, composition of image data displayed on the display device 8, and the like, among the computational processing in the ECU 14. The audio control unit 14e mainly executes processing for audio data output by the audio output device 9 among the computational processing in the ECU 14. The SSD 14f is a rewritable nonvolatile storage unit, and can store data even if the power supply of the ECU 14 is turned off. Note that the CPU 14a, the ROM 14b, the RAM 14c, and the like can be integrated in the same package. The ECU 14 may have a configuration in which, instead of the CPU 14a, another logical operation processor such as a digital signal processor (DSP), a logic circuit, or the like is used. Further, a hard disk drive (HDD) may be provided instead of the SSD 14f, and the SSD 14f and the HDD may be provided separately from the ECU 14. The ECU 14 is an example of a parking assistance device.

The brake system 18 is, for example, an anti-lock brake system (ABS) that suppresses locking of a brake, an electronic stability control (ESC) that suppresses skidding of the vehicle 1 at the time of cornering, an electric brake system that enhances braking force (executes brake assist), a brake by wire (BBW), or the like. The brake system 18 applies braking force to the wheel 3 and thus the vehicle 1 via the actuator 18a. In addition, the brake system 18 can execute various controls by detecting brake lock-up, idle rotation of the wheel 3, a sign of skidding, or the like from the difference in the rotations of the left and right wheels 3, or the like. The brake sensor 18b is, for example, a sensor that detects the position of the movable portion of the braking operation unit 6. The brake sensor 18b can detect the position of the brake pedal as the movable portion. The brake sensor 18b includes a displacement sensor.

The steering angle sensor 19 is, for example, a sensor that detects the amount of steering of the steering unit 4 such as a steering wheel. The steering angle sensor 19 is configured using, for example, a Hall element or the like. The ECU 14 acquires the amount of steering of the steering unit 4 by the driver, the amount of steering of each wheel 3 at the time of automatic steering, and the like from the steering angle sensor 19 and executes various controls. Note that the steering angle sensor 19 detects the rotation angle of the rotating portion included in the steering unit 4. The steering angle sensor 19 is an example of an angle sensor.

The accelerator sensor 20 is, for example, a sensor that detects the position of the movable portion of the acceleration operation unit 5. The accelerator sensor 20 can detect the position of the accelerator pedal as the movable portion. The accelerator sensor 20 includes a displacement sensor.

The shift sensor 21 is, for example, a sensor that detects the position of the movable portion of the shift operation unit 7. The shift sensor 21 can detect positions of a lever, an arm, a button, and the like as the movable portion. The shift sensor 21 may include a displacement sensor or may be configured as a switch.

The wheel speed sensor 22 is a sensor that detects the amount of rotation of the wheel 3 and the number of rotations per unit time. The wheel speed sensor 22 outputs the number of wheel speed pulses indicating the detected number of rotations as a sensor value. The wheel speed sensor 22 can be configured using, for example, a Hall element or the like. The ECU 14 calculates the amount of movement and the like of the vehicle 1 on the basis of the sensor value acquired from the wheel speed sensor 22 and executes various controls. Note that the wheel speed sensor 22 may be provided in the brake system 18. In this case, the ECU 14 acquires the detection result of the wheel speed sensor 22 via the brake system 18.

Note that the configurations, arrangements, electrical connection forms, and the like of the various sensors and actuators described above are merely examples, and can be set (changed) in various ways.

Figure 5:
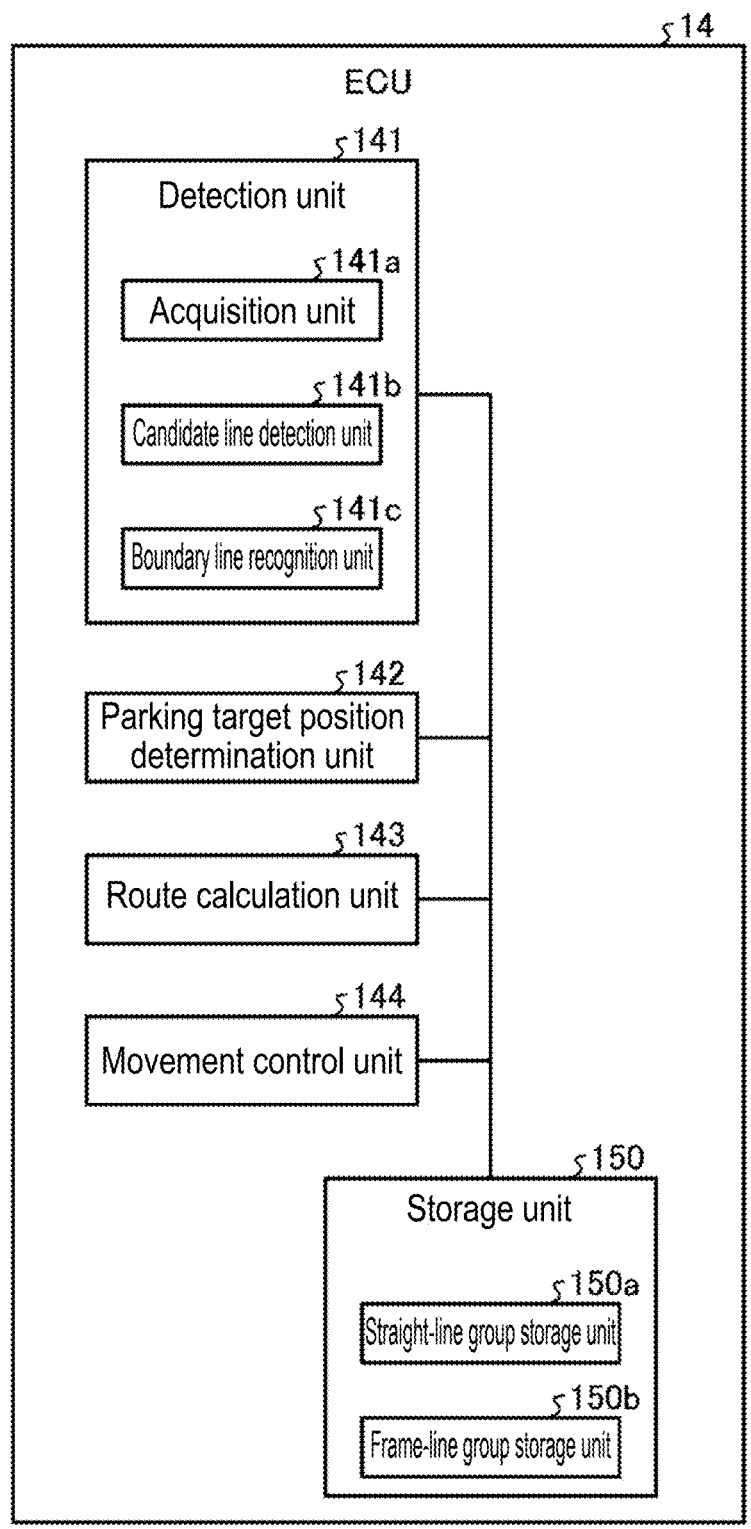
FIG. 5 is a block diagram showing an example of the functional configuration of the ECU (parking assistance device) according to the embodiment.

FIG. 5 is a block diagram showing an example of the functional configuration of the ECU 14 according to the present embodiment. As shown in FIG. 5, the ECU 14 includes a detection unit 141, a parking target position setting unit 142, a route calculation unit 143, a movement control unit 144, and a storage unit 150.

Each configuration of the detection unit 141, the parking target position setting unit 142, the route calculation unit 143, and the movement control unit 144 shown in FIG. 5 is achieved by the CPU 14a executing a program stored in the ROM 14b. Note that these configurations may be achieved by a hardware circuit.

The detection unit 141 detects a boundary line in accordance with image data around the vehicle 1 captured by the imaging unit 15. The boundary line is, for example, a white line having a width. The detection unit 141 stores the data (e.g., position information) of the detected boundary line in the storage unit 150. That is, the detection unit 141 manages the boundary line. The detection unit 141 accesses the storage unit 150, refers to the data of the boundary line, and detects the possible parking area around the vehicle 1 based on the boundary line (e.g., with reference to the boundary line). The detection unit 141 supplies a detection result to the parking target position setting unit 142.

The parking target position setting unit 142 determines a target parking area and a parking target position for the vehicle 1 on the basis of the detection result of the detection unit 141 and the like. When the detection unit 141 detects a plurality of possible parking areas, the parking target position setting unit 142 may receive a selection operation by the driver as to which possible parking area will be set as the target parking area. For example, the parking target position setting unit 142 receives the selection operation of the driver through an operation signal acquired from the operation unit 14g.

The route calculation unit 143 calculates a movement route for moving the vehicle 1 from the current position to the parking target position when parking assistance is started. For example, the route calculation unit 143 calculates a guidance route when receiving an instruction to start parking assistance by an operation signal acquired from the operation unit 14g. The route calculation unit 143 outputs the data of the calculated movement route to the storage unit 150.

Although the parking target position setting unit 142 and the route calculation unit 143 receive the operation of the driver through the operation signal acquired from the operation unit 14g, the operation input of the driver is not limited thereto. For example, the process described above may be executed by receiving the operation of the driver input from the operation input unit 10.

The movement control unit 144 executes steering control on the basis of the data of the movement route to move the vehicle 1. Specifically, the movement control unit 144 accesses the storage unit 150, refers to the data of the movement route, and controls the actuator 13a of the steering system 13 according to the position of the vehicle 1 so that the vehicle 1 moves along the movement route. At this time, for example, the vehicle 1 is accelerated or decelerated (braked) according to the operation of the acceleration operation unit 5 or the braking operation unit 6 by the driver. Further, the movement control unit 144 may display a guide on the monitor device 11 or the like to instruct the driver to operate the acceleration operation unit 5 or the braking operation unit 6.

The storage unit 150 includes, for example, a storage device such as the SSD 14f. In addition, the storage unit 150 stores the data of the boundary line and the data of the movement route in the parking assistance. Specifically, the storage unit 150 includes a straight-line group storage unit 150a and a frame-line group storage unit 150b. The straight-line group storage unit 150a stores straight line data. The frame-line group storage unit 150b stores frame line data.

As an example of the parking assistance, an example in which automatic steering is executed by the movement control unit 144 and other operations are executed by the driver himself/herself is illustrated, but the parking assistance is not limited thereto. For example, in addition to steering, the movement control unit 144 may automatically control the operation of the acceleration operation unit 5. In addition, a configuration in which the movement control unit 144 automatically controls the operation of the shift operation unit 7 may be adopted.

Figure 6:
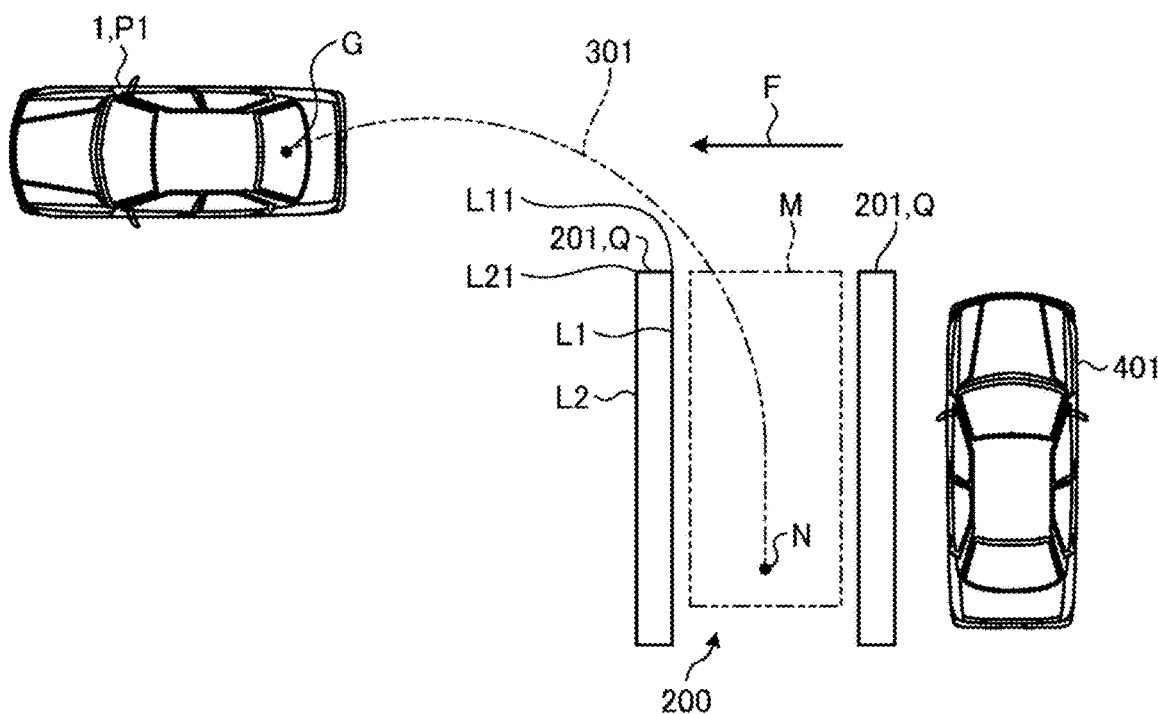
FIG. 6 is a diagram showing an example of a movement route generated by the ECU (parking assistance device) according to the embodiment.

FIG. 6 is a diagram showing an example of the movement route generated by the ECU (parking assistance device) according to the present embodiment. In the example of FIG. 6, the vehicle 1 images the periphery while traveling in the direction indicated by arrow F. The detection unit 141 detects a boundary line 201 on a road surface 200 in the image data captured by the imaging unit 15. Then, the parking target position setting unit 142 specifies a parking area M from the detection result of the boundary line 201, and then specifies a parking target position N for parking in the parking area M. In the present embodiment, for example, a center position of a line connecting the left and right rear wheels 3R of the vehicle 1 is set as a reference position G, and a position at which the reference position G reaches is set as a parking target position N. A movement route 301 is a route from a position P1 of the vehicle 1 at the time when parking assistance is started to the parking target position N. In the example of FIG. 6, another vehicle 401 is parked adjacent to the boundary line 201.

Figure 7:
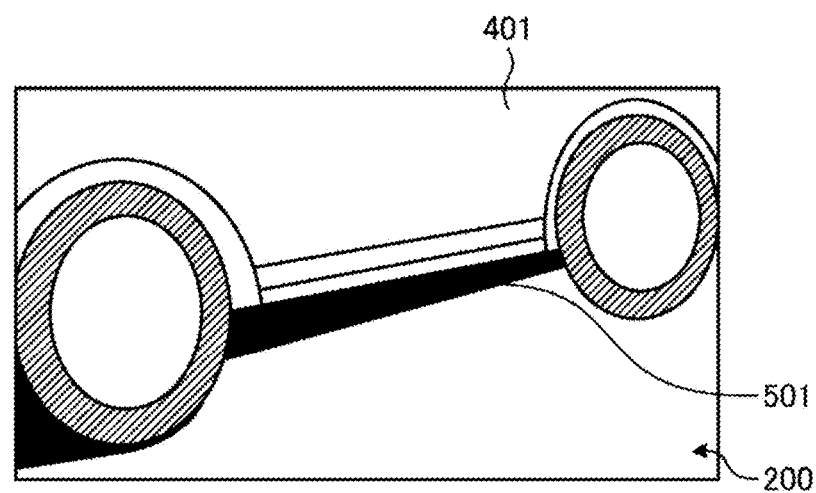
FIG. 7 is a diagram showing image data obtained by imaging the road surface according to the embodiment.
Figure 8:
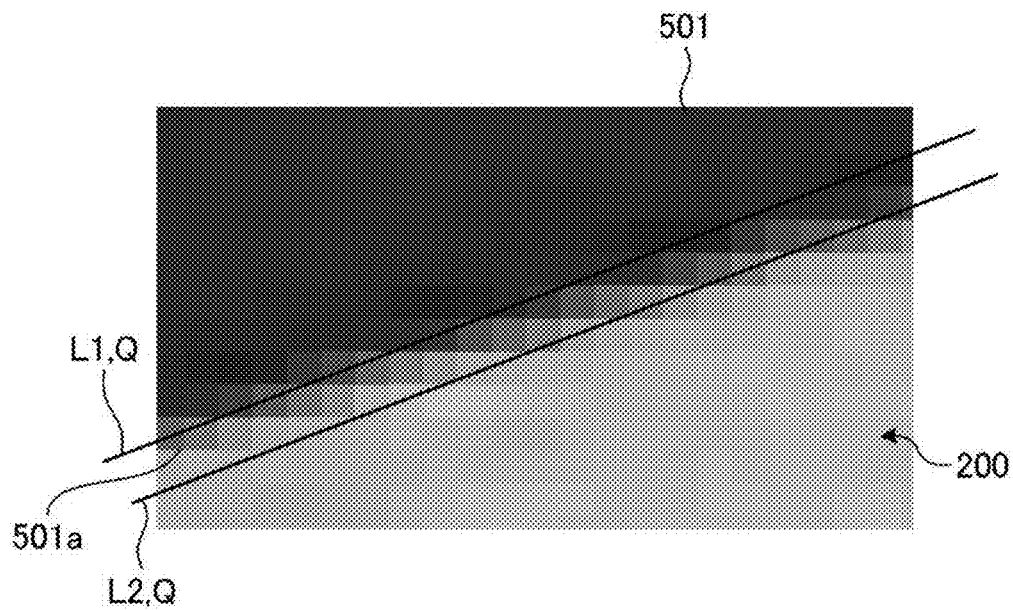
FIG. 8 is an enlarged view showing an edge of a shadow in the image data of FIG. 7.

FIG. 7 is a diagram showing image data obtained by imaging the road surface 200 according to the embodiment. Specifically, FIG. 7 shows image data when a shadow 501 of another vehicle 401, the shadow 501 of another vehicle 401, is on the road surface 200. FIG. 8 is an enlarged view of an edge 501a of the shadow 501 in the image data of FIG. 7.

As shown in FIG. 7, for example, when the shadow 501 of another vehicle 401 is on the road surface 200, color blurring may occur at the edge of the shadow 501 as shown in FIG. 8 in imaging data obtained by imaging the edge 501a of the shadow 501. In such a case, in the present embodiment, the following process is performed so as not to erroneously recognize the blurring portion as the boundary line 201.

Figure 9:
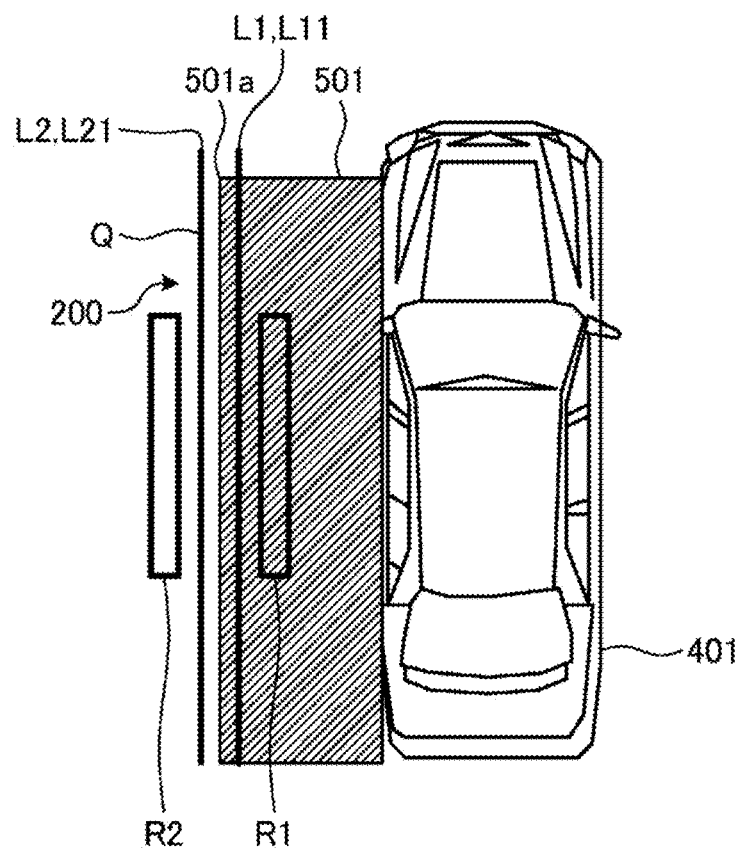
FIG. 9 is a view for explaining a determination process executed by the ECU (parking assistance device) according to the embodiment.
Figure 10:
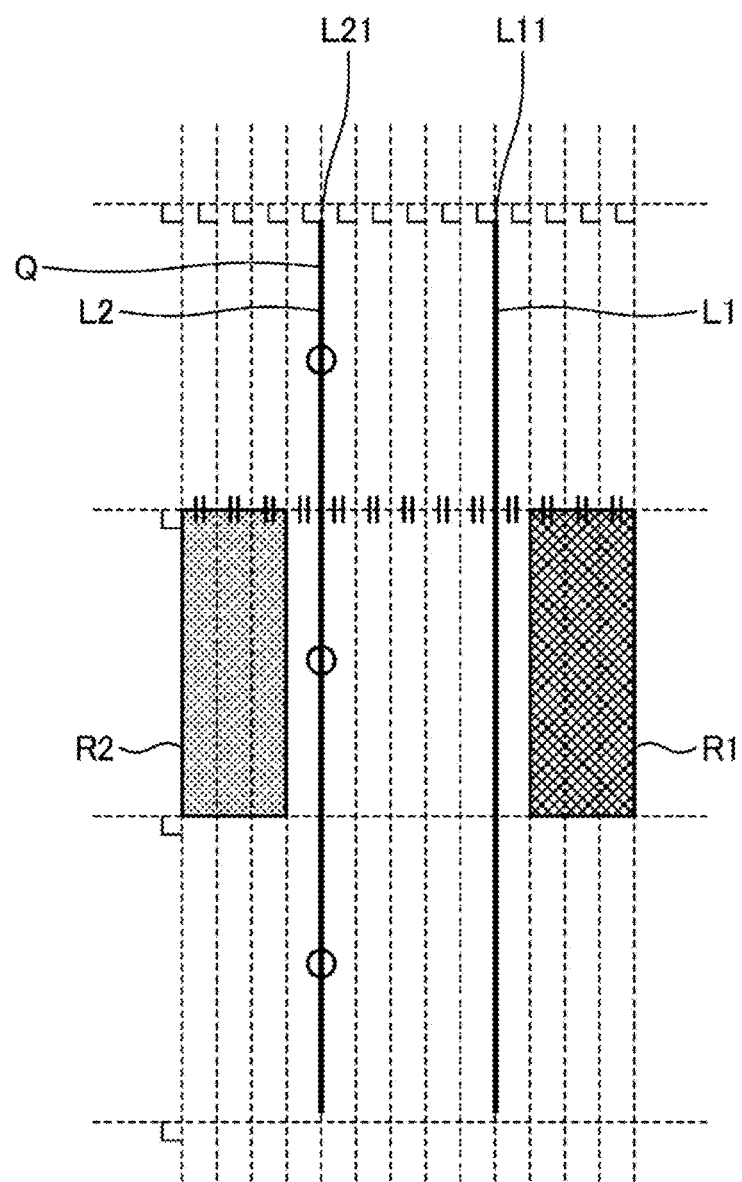
FIG. 10 is a view for explaining a pair of areas in the determination process executed by the ECU (parking assistance device) according to the embodiment.
Figure 11:
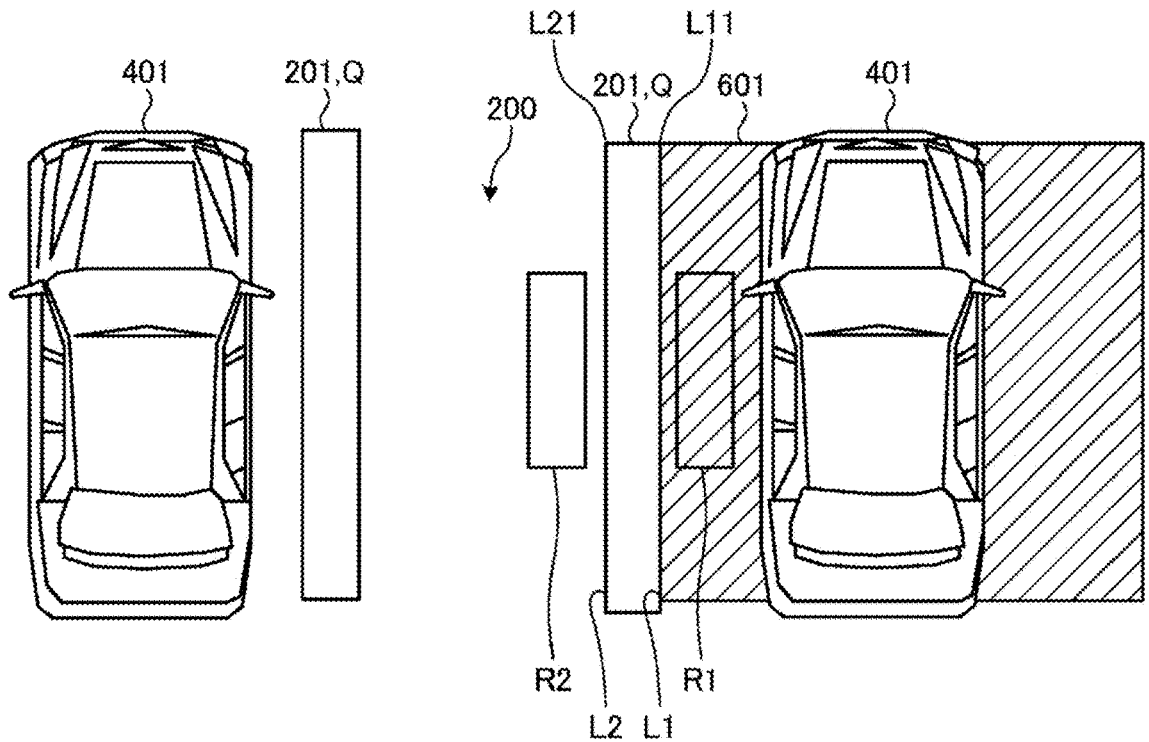
FIG. 11 is a view for explaining a road surface on which coating is applied adjacent to a boundary line in the embodiment.

FIG. 9 is a view for explaining a determination process executed by the ECU (parking assistance device) according to the embodiment. FIG. 10 is a view for explaining a pair of areas in the determination process executed by the ECU (parking assistance device) according to the embodiment. FIG. 11 is a view for explaining a road surface on which coating is applied adjacent to a boundary line in the embodiment.

A candidate line detection unit 141b detects a candidate line Q that is a candidate for the boundary line 201 in the image data acquired by the imaging of the periphery of the vehicle 1. As shown in FIGS. 6, 8, and 9, the candidate line Q is defined by a pair of straight lines L1, L2. The pair of straight lines L1, L2 are lines arranged at parallelism within a prescribed range. The candidate line Q is the boundary line 201 in FIG. 6, and is the edge 501a of the shadow 501 in FIGS. 8 and 9. That is, the edge 501a is a line (strip-shaped line) defined by the pair of straight lines L1, L2 and having a width with the facing direction of the pair of straight lines L1, L2 as the width direction.

A boundary line recognition unit 141c sets a pair of areas R1, R2 on both sides in the width direction of the candidate line Q in the image data (FIG. 9). The pair of areas R1, R2 is determined on the basis of, for example, the candidate line Q. As shown in FIG. 10, the pair of areas R1, R2 is line-symmetric with respect to the candidate line Q. Each of the pair of areas R1, R2 is set at a prescribed distance from the candidate line Q. The prescribed distance is a distance smaller than the width of the candidate line Q (the width between the straight line L1 and the straight line L2). The width of each of the areas R1, R2 is narrower than the width of the candidate line Q. The length of each of the areas R1, R2 is shorter than the length of the candidate line Q. Each of the areas R1, R2 is set to a size including a plurality of pixels. Note that the shape of each of the areas R1, R2 is not limited to the above.

The boundary line recognition unit 141c executes a determination process to determine whether or not the difference in luminance between the pair of areas R1, R2 is equal to or larger than a luminance threshold. The boundary line recognition unit 141c does not recognize the candidate line Q as the boundary line 201 when determining that the luminance difference is equal to or larger than the luminance threshold, and recognizes the candidate line Q as the boundary line 201 when determining that the luminance difference is less than the luminance threshold. The difference in luminance between the pair of areas R1, R2 is, for example, a difference between an average value of luminance of a plurality of pixels in one area R1 and an average value of luminance of a plurality of pixels in the other area R2. By using the pair of areas R1, R2 in this manner, the luminance search range can be set to the minimum. The reason why the pair of areas R1, R2 is separated from the straight lines L1, L2 of the candidate line Q is that the luminance near the straight lines L1, L2 is not stable.

Here, as shown in FIG. 11, when a coating 601 (filling) is applied to the parking slot adjacent to the boundary line 201 on the road surface 200, the luminance of the portion of the coating 601 tends to be small. Thus, even if the candidate line Q is a normal boundary line 201, there is a possibility that the luminance difference between the pair of areas R1, R2 on both sides thereof becomes equal to or larger than the luminance threshold. Therefore, when the width of the candidate line Q exceeds the width threshold, the boundary line recognition unit 141c recognizes the candidate line Q as the boundary line 201 without executing the determination process. For example, the color blurring width of the edge 501a of the shadow 501 in the image data is narrower than that of the general white line boundary line 201. Therefore, by setting the width threshold to be larger than the width of the blurring and smaller than the width of the predetermined boundary line 201, the boundary line recognition unit 141c can recognize the candidate line Q as the boundary line 201 when the width of the candidate line Q exceeds the width threshold even if there is a difference in luminance between both sides of the candidate line Q.

When the resolution of the pixel of the candidate line Q in the image data exceeds the resolution threshold, the boundary line recognition unit 141c recognizes the candidate line Q as the boundary line 201 without executing the determination process. The resolution of the pixel of the candidate line Q is, for example, the resolution of the pixel at the end portion of the candidate line Q on the vehicle 1 side. Specifically, the resolution is obtained by [Distance (mm) between respective front ends L11, L21 (two points) of straight lines L1, L2]÷[Pixel distance (pixel) between respective front ends L11, L21 (two points) of straight lines L1, L2]. The front ends L11, L21 of the straight lines L1, L2 are ends on the vehicle 1 side among both ends of the straight lines L1, L2 expressed in a coordinate system with the current (latest) position of the vehicle 1 as the origin. The resolution threshold is, for example, 50 to 80 (mm/pixel). Note that the resolution threshold may be other than the above. In the image data, as the distance from the image center increases, that is, as the resolution of the pixel increases, color blurring due to chromatic aberration easily occurs. In other words, in the image data, color blurring due to chromatic aberration is less likely to occur as the position is closer to the center of the image, that is, as the resolution of the pixel is smaller. Therefore, even if there is a difference in luminance between both sides of the candidate line Q, when the resolution of the pixel in the candidate line Q exceeds the resolution threshold, the boundary line recognition unit 141c can recognize the candidate line Q as the boundary line 201.

Figure 12:
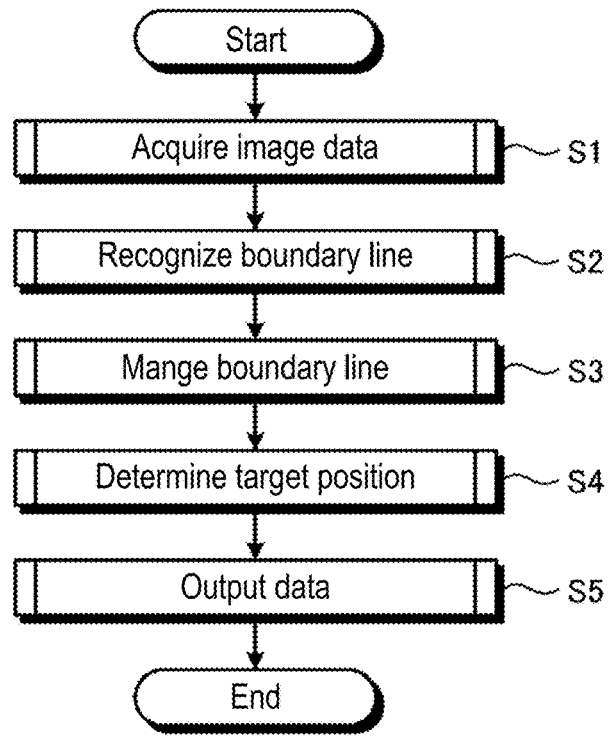
FIG. 12 is a flowchart showing a process of setting a parking target position for a vehicle in the embodiment.

Next, a process of setting the parking target position for the vehicle will be described with reference to FIG. 12. FIG. 12 is a flowchart showing a process of setting a parking target position for the vehicle.

In ECU 14, the detection unit 141 acquires the data of the road surface image captured by the imaging unit 15 (S1), and recognizes (detects) the boundary line in the image data (S2). The detection unit 141 supplies the recognition result to the parking target position setting unit 142, stores the data of the boundary line in the storage unit 150, and manages the boundary line (S3). The detection unit 141 accesses the storage unit 150, refers to the data of the boundary line, and detects the possible parking area around the vehicle 1 based on the boundary line (e.g., with reference to the boundary line). The detection unit 141 supplies a detection result to the parking target position setting unit 142. The parking target position setting unit 142 determines a target parking area and a parking target position for the vehicle 1 on the basis of the detection result of the detection unit 141 and the like (S4). The route calculation unit 143 calculates a movement route for moving the vehicle 1 from the current position to the parking target position when parking assistance is started. The route calculation unit 143 outputs data of the calculated movement route to the storage unit 150 (S5) The movement control unit 144 accesses the storage unit 150, refers to the data of the movement route, and executes steering control to move the vehicle 1 so that the vehicle 1 moves along the movement route.

Figure 13:
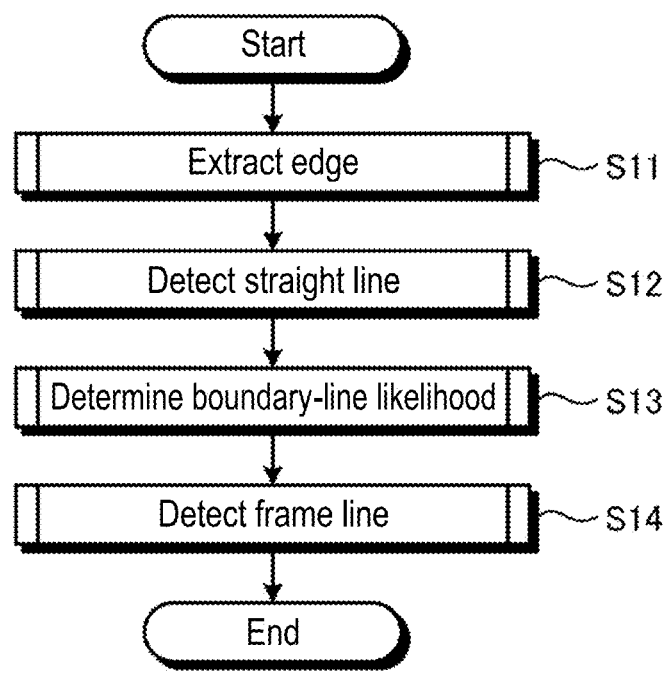
FIG. 13 is a flowchart showing a boundary line recognition process for a vehicle according to the embodiment.

Next, details of the boundary line recognition process (S2) will be described with reference to FIG. 13. FIG. 13 is a flowchart showing a boundary line recognition process for the vehicle 1 according to the embodiment.

The detection unit 141 extracts an edge in the acquired image data (S11), and extracts a straight line in the image data on the basis of the extracted edge (S12). The detection unit 141 determines a boundary-line likelihood for the extracted straight line (S13). The boundary-line likelihood is based on, for example, the length of a straight line. When the length of the straight line is within a predetermined range, the detection unit 141 determines that the straight line is likely to be a boundary line (likely to be a part of the boundary line). The detection unit 141 causes the straight-line group storage unit 150a to store the straight line determined to be likely to be the boundary line (likely to be a part of the boundary line). Next, the detection unit 141 detects a frame line (S14). The frame line is a pair of straight lines constituting the boundary line. In step S14, specifically, the detection unit 141 detects a boundary line including a frame line.

Figure 14:
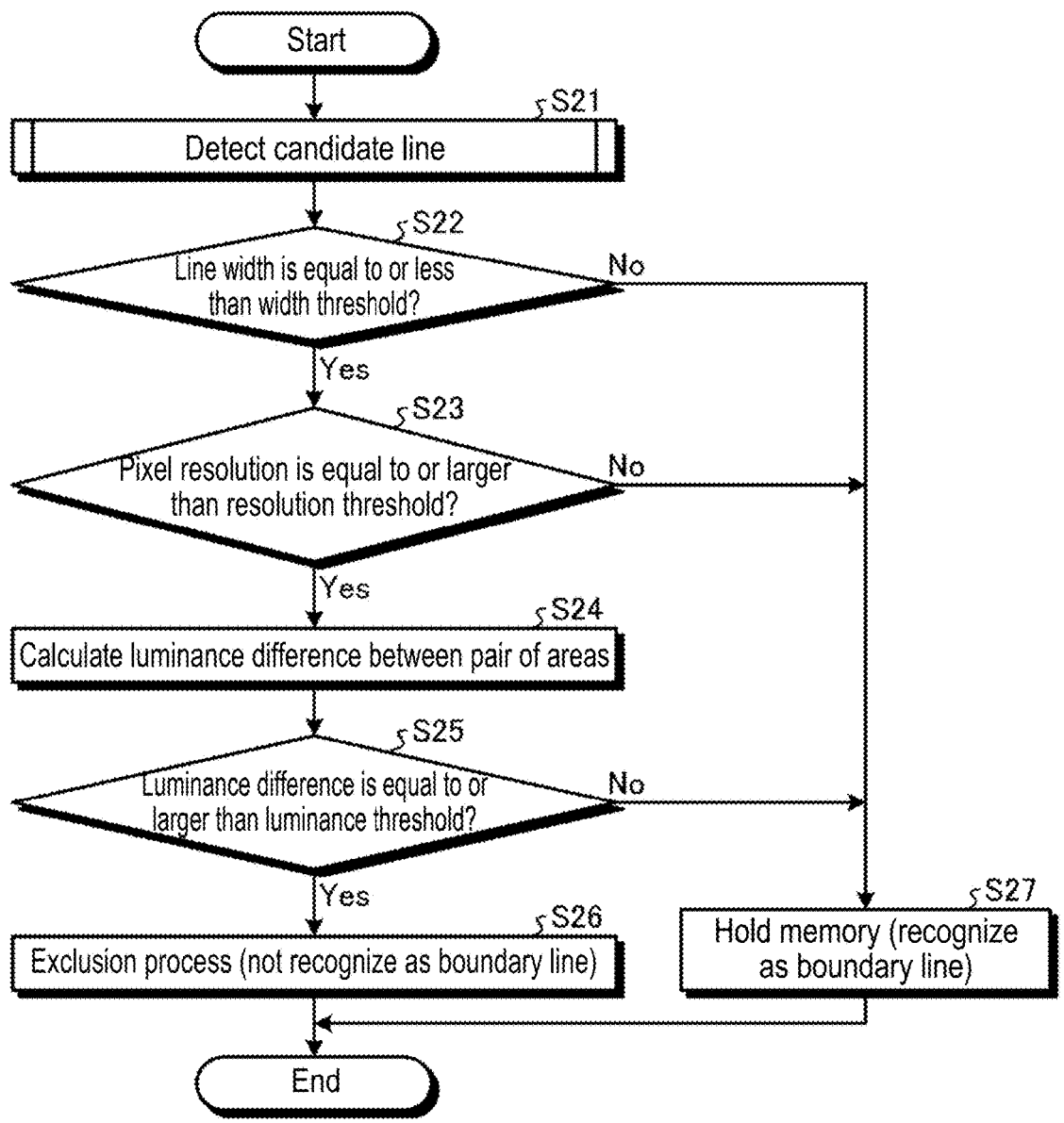
FIG. 14 is a flowchart showing a frame line detection process for the vehicle according to the embodiment.

Next, details of the frame line detection process (S14) will be described with reference to FIG. 14. FIG. 14 is a flowchart showing a frame line detection process for the vehicle according to the embodiment.

The candidate line detection unit 141b detects the candidate line Q (S21). Specifically, the candidate line detection unit 141b determines a pair (straight line pair) from the straight lines stored in the straight-line group storage unit 150a. The candidate line detection unit 141b determines that two straight lines, having an interval equal to or less than a predetermined interval and having parallelism within a predetermined range, are paired. These two straight lines are frame lines of the candidate lines. That is, the candidate line detection unit 141b detects the candidate line. The candidate line detection unit 141b associates and stores the two straight lines determined to be paired in the frame-line group storage unit 150b. In other words, the candidate line detection unit 141b stores the candidate line in the frame-line group storage unit 150b.

Next the boundary line recognition unit 141c determines whether the width of candidate line Q is equal to or less than the width threshold (S22). When the width of the candidate line Q is equal to or less than the width threshold (S22: Yes), the boundary line recognition unit 141c determines whether or not the pixel resolution of the candidate line Q is equal to or larger than the resolution threshold (S23). When the pixel resolution is equal to or larger than the resolution threshold (S23: Yes), the boundary line recognition unit 141c performs the determination process (S24 to S25). Specifically, the boundary line recognition unit 141c calculates a luminance difference that is a difference in luminance between the pair of areas R1, R2 (S24), and determines whether or not the luminance difference is equal to or larger than the luminance threshold (S25). When it is determined that the luminance difference is equal to or larger than the luminance threshold (S25: Yes), the boundary line recognition unit 141c does not recognize the candidate line Q as the boundary line 201, and performs an exclusion process (S26). The exclusion process is a process of deleting the paired straight lines (candidate line Q) from the frame-line group storage unit 150b.

On the other hand, when determining that the luminance difference is less than the luminance threshold in S25 (S25: No), the boundary line recognition unit 141c holds the memory of the paired straight lines (candidate line Q) stored in the frame-line group storage unit 150b (S27). That is, the boundary line recognition unit 141c recognizes the candidate line Q as the boundary line 201.

In either case where the width of the candidate line Q exceeds the width threshold (S22: No) or where the pixel resolution is equal to or larger than the resolution threshold (S23: No), the boundary line recognition unit 141c holds the memory of the paired straight lines (candidate line Q) stored in the frame-line group storage unit 150b without executing the determination process in S24 to S25 (S27). That is, the boundary line recognition unit 141c recognizes the candidate line Q as the boundary line 201.

As described above, in the present embodiment, the ECU 14 (parking assistance device) includes the candidate line detection unit 141b, the boundary line recognition unit 141c, the parking target position setting unit 142, and the movement control unit 144. The candidate line detection unit 141b detects the candidate line Q that is a candidate for the boundary line 201 in the image data obtained by imaging the periphery of the vehicle 1. The boundary line recognition unit 141c executes a determination process to determine whether or not a difference in luminance between the pair of areas R1, R2 on both sides in the width direction of the candidate line Q in the image data is equal to or larger than a luminance threshold. The boundary line recognition unit 141c does not recognize the candidate line Q as the boundary line 201 when determining that the luminance difference is equal to or larger than the luminance threshold, and recognizes the candidate line Q as the boundary line 201 when determining that the luminance difference is less than the luminance threshold. The parking target position setting unit 142 sets the parking target position N on the basis of the boundary line 201. The movement control unit 144 moves the vehicle 1 to the parking target position N.

With such a configuration, for example, even if the candidate line detection unit 141b detects the edge 501a of the shadow 501 as the candidate line Q in the image data obtained by imaging the edge 501a of the shadow 501, when a difference in luminance between the pair of areas R1, R2 on both sides of the candidate line Q is equal to or larger than the luminance threshold, the boundary line recognition unit 141c does not recognize the candidate line Q, that is, the edge of the shadow, as the boundary line 201. Therefore, with the above configuration, the edge 501a of the shadow 501 is suppressed from being erroneously recognized as the boundary line 201, so that it is possible to improve the accuracy in the detection of the boundary line 201.

When the width of the candidate line Q exceeds the width threshold, the boundary line recognition unit 141c recognizes the candidate line Q as the boundary line 201 without executing the determination process.

With such a configuration, even if the normal boundary line 201 is detected as the candidate line Q in the image data obtained by imaging the normal boundary line 201, and there is a difference in luminance between both sides of the candidate line Q, when the width of the candidate line Q exceeds the width threshold, the boundary line recognition unit 141c recognizes the candidate line Q as the boundary line 201. Therefore, with the above configuration, the edge 501a of the shadow 501 is suppressed from being erroneously recognized as the boundary line 201, and the normal boundary line 201 is easily recognized correctly.

When the resolution of the pixel of the candidate line Q in the image data exceeds the resolution threshold, the boundary line recognition unit 141c recognizes the candidate line Q as the boundary line 201 without executing the determination process.

With such a configuration, even if there is a difference in luminance between both sides of the candidate line Q, when the resolution of the pixel in the candidate line Q exceeds the resolution threshold, the boundary line recognition unit 141c recognizes the candidate line Q as the boundary line 201. Therefore, with the above configuration, the edge of the shadow is suppressed from being erroneously recognized as the boundary line 201, and the normal boundary line 201 is easily recognized correctly.

The difference in luminance between the pair of areas R1, R2 is a difference between an average value of luminance of a plurality of pixels in one area R1 and an average value of luminance of a plurality of pixels in the other area R2.

With such a configuration, for example, the average value of the luminance of the plurality of pixels in the areas R1, R2 is used for determination, so that the luminance of the pair of areas R1, R2 can be compared even if the luminance varies in the areas R1, R2.

Note that, in the present embodiment, an example of the RGB color system is shown as the color system of the image data, but the present disclosure is not limited thereto. For example, the color system of the image data may be a YUV color system, an HSV color system, an HSL color system, or the like.

Although the embodiments of the present disclosure have been exemplified above, the above embodiments are merely examples, and are not intended to limit the scope of the invention. The embodiments can be implemented in various other forms, and various omissions, substitutions, combinations, and changes can be made without departing from the gist of the disclosure. In addition, the configuration and shape of each example can be partially interchanged. In addition, specifications (structure, type, direction, shape, size, length, width, height, number, arrangement, position, etc.) of each configuration, shape, and the like can be appropriately changed and implemented.

REFERENCE SIGNS LIST

1: Vehicle, 14: ECU (parking assistance device), 141b: Candidate line detection unit, 141c: Boundary line recognition unit, 142: Parking target position setting unit, 144: Movement control unit, 201: Boundary line, N: Parking target position, and Q: Candidate line

The invention claimed is:

1. A parking assistance device comprising:
a candidate line detection unit that detects a candidate line that is a candidate for a boundary line in image data obtained by imaging a periphery of a vehicle;
a boundary line recognition unit that executes a determination process to determine whether or not a difference in luminance between areas on an outside of the candidate line in a width direction in the image data, the areas being on both sides of the candidate line, is equal to or larger than a luminance threshold, does not recognize the candidate line as a boundary line when determining that the difference in luminance is equal to or larger than the luminance threshold, and recognizes the candidate line as a boundary line when determining that the difference in luminance is less than the luminance threshold;
a parking target position setting unit that sets a parking target position on a basis of the boundary line; and
a movement control unit that moves the vehicle to the parking target position.

2. The parking assistance device according to claim 1, wherein the boundary line recognition unit executes the determination process when a width of the candidate line does not exceed a width threshold.

3. The parking assistance device according to claim 1, wherein the boundary line recognition unit executes the determination process when a resolution of the pixel of the candidate line in the image data does not exceed a resolution threshold.

4. The parking assistance device according to claim 1, wherein a difference in luminance between the areas on both sides is a difference between an average value of the luminance of a plurality of pixels in one of the areas and an average value of the luminance of a plurality of pixels in the other of the areas.

5. The parking assistance device according to claim 1, wherein the areas on both sides are located at positions separated from the candidate line by a predetermined distance.

* * * * *